US011808982B2

(12) United States Patent
Matsumoto

(10) Patent No.: US 11,808,982 B2
(45) Date of Patent: Nov. 7, 2023

(54) OPTICAL COMBINER, LASER DEVICE, AND METHOD FOR MANUFACTURING OPTICAL COMBINER

(71) Applicant: FUJIKURA LTD., Tokyo (JP)

(72) Inventor: Ryokichi Matsumoto, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/629,569

(22) PCT Filed: Jun. 22, 2020

(86) PCT No.: PCT/JP2020/024392
§ 371 (c)(1),
(2) Date: Jan. 24, 2022

(87) PCT Pub. No.: WO2021/029145
PCT Pub. Date: Feb. 18, 2021

(65) Prior Publication Data
US 2022/0269095 A1 Aug. 25, 2022

(30) Foreign Application Priority Data

Aug. 9, 2019 (JP) ................................ 2019-147901

(51) Int. Cl.
G02B 6/255 (2006.01)
G02B 6/04 (2006.01)
(Continued)

(52) U.S. Cl.
CPC ............ *G02B 6/2551* (2013.01); *G02B 6/04* (2013.01); *G02B 6/287* (2013.01); *G02B 27/1006* (2013.01)

(58) Field of Classification Search
None
See application file for complete search history.

(56) References Cited

U.S. PATENT DOCUMENTS 9,088,129 B2* 7/2015 Kashiwagi ........... G02B 6/2852
11,005,230 B2* 5/2021 Sugiyama ............ H01S 3/2383
(Continued)

FOREIGN PATENT DOCUMENTS

CN 102668272 A 9/2012
CN 105026971 A 11/2015
(Continued)

OTHER PUBLICATIONS

Written Opinion issued in corresponding International Application No. PCT/JP2020/024392, dated Aug. 25, 2020 (12 pages).
(Continued)

*Primary Examiner* — Jerry Rahll
(74) *Attorney, Agent, or Firm* — Osha Bergman Watanabe & Burton LLP

(57) ABSTRACT

An optical combiner includes: an optical fiber bundle formed by a plurality of first optical fibers; and a second optical fiber including an end surface joined to an end surface of the optical fiber bundle by fusion-splicing. The plurality of first optical fibers includes a predetermined first optical fiber and other first optical fibers. The predetermined first optical fiber is composed of one or more materials having higher softening temperatures than one or more materials of the other first optical fibers.

9 Claims, 2 Drawing Sheets

(51) Int. Cl.
*G02B 6/287* (2006.01)
*G02B 27/10* (2006.01)

(56) References Cited

U.S. PATENT DOCUMENTS

| | | | |
|---|---|---|---|
| 2002/0054740 A1 | 5/2002 | Vakili et al. | |
| 2005/0094952 A1* | 5/2005 | Gonthier | G02B 6/2821 385/100 |
| 2005/0105854 A1* | 5/2005 | Dong | G02B 6/2551 385/46 |
| 2007/0003196 A1 | 1/2007 | Holcomb et al. | |
| 2008/0050069 A1 | 2/2008 | Skovgaard et al. | |
| 2009/0202204 A1* | 8/2009 | Nielsen | G02B 6/2856 264/1.25 |
| 2010/0142894 A1* | 6/2010 | Gonthier | G02B 6/2804 385/50 |
| 2012/0206793 A1* | 8/2012 | Tanaka | G02B 6/2804 359/341.3 |

FOREIGN PATENT DOCUMENTS

| | | |
|---|---|---|
| CN | 106054395 A | 10/2016 |
| JP | 2004/053757 A | 2/2004 |
| JP | 2008-64875 A | 3/2008 |
| JP | 2009-124014 A | 6/2009 |
| JP | 2011-034040 A | 2/2011 |
| JP | 2011-243672 A | 12/2011 |
| JP | 2018-190918 A | 11/2018 |
| WO | 2011/004539 A1 | 1/2011 |
| WO | 2011-052373 A1 | 5/2011 |
| WO | 2018/207872 A1 | 11/2018 |

OTHER PUBLICATIONS

International Search Report issued in corresponding International Application No. PCT/JP2020/024392, dated Aug. 25, 2020 (3 pages).

* cited by examiner

MATERIALS MAKING UP OPTICAL FIBER BUNDLE 11
OPTICAL FIBER 117
　CORE 1171: Ge-DOPED QUARTZ
　CLADDING 1172: QUARTZ CONTAINING NO DOPANT
OPTICAL FIBERS 111 TO 116: F-DOPED QUARTZ

OPTICAL COMBINER, LASER DEVICE, AND METHOD FOR MANUFACTURING OPTICAL COMBINER

TECHNICAL FIELD

The present invention relates to an optical combiner, a laser device, and a method for manufacturing the optical combiner.

BACKGROUND

Patent Literature 1 discloses, in FIG. 2 of Patent Literature 1, an optical combiner including (a) an optical fiber bundle formed by seven first optical fibers and (b) a second optical fiber having a diameter equal to or larger than a diameter of the optical fiber bundle. In the optical combiner, an end surface of the optical fiber bundle and an end surface of the second optical fiber are joined together by fusion-splicing. The second optical fiber has a core optically coupled to a core of one first optical fiber out of the seven first optical fibers, the one first optical fiber being located in the center of the seven first optical fibers. The second optical fiber also has a cladding optically coupled to cores of six first optical fibers out of the seven first optical fibers, the six first optical fibers being located in an outer circumferential part of the optical fiber bundle.

CITATION LIST

Patent Literature

Patent Literature 1

Japanese Patent Application Publication, Tokukai, No. 2018-190918

In this optical combiner, the first optical fibers of the optical fiber bundle have respective end portions facing the second optical fiber. The end portions are united together by fusion, so that a fused portion is formed. This prevents gaps from being left between the first optical fibers. When light propagates from the second optical fiber toward the optical fiber bundle, the light can be prevented from leaking out of the optical combiner through gaps between the first optical fibers since, as described above, there are no gaps.

When the fused portion is formed, the optical fiber bundle is externally heated so that the first optical fibers are each fused. This causes a cross section of each of the first optical fibers to deform from a circular shape, which is the shape before fusion (see (c) of FIG. 3 of Patent Literature 1). This causes deformation of the core of one of the first optical fibers as well, the one first optical fiber being located in the center and coupled to the core of the second optical fiber. This may cause deterioration in quality of the following beams: (1) a beam which enters through an end surface of such a predetermined first optical fiber, the end surface not being joined to the second optical fiber by fusion-splicing, and which exits through an end surface of the second optical fiber, the end surface not being joined to the optical fiber bundle by fusion-splicing, and/or (2) a beam which enters through the end surface of the second optical fiber, the end surface not being joined to the optical fiber bundle by fusion-splicing, and which exits through the end surface of the predetermined first optical fiber, the end surface not being joined to the second optical fiber by fusion-splicing. Such deterioration in quality of the beams may occur also in an optical combiner obtained by joining together an optical fiber bundle and a second optical fiber by fusion-splicing without forming a fused portion, i.e., in an optical combiner in which gaps are left between a plurality of first optical fibers.

SUMMARY

One or more embodiments of the present invention reduce deformation in a cross section of a predetermined first optical fiber in an optical combiner more than in conventional optical combiners, the optical combiner being obtained by joining, by fusion-splicing, an optical fiber bundle formed by a plurality of first optical fibers to a second optical fiber.

An optical combiner in accordance with one or more embodiments of the present invention includes: an optical fiber bundle formed by a plurality of first optical fibers; and a second optical fiber having an end surface joined to an end surface of the optical fiber bundle by fusion-splicing, the plurality of first optical fibers including at least one predetermined first optical fiber and the other first optical fibers, the at least one predetermined first optical fiber being composed of one or more materials having higher softening temperatures than one or more materials for the other first optical fibers.

A method, in accordance with one or more embodiments of the present invention, for manufacturing an optical combiner including: an optical fiber bundle formed by a plurality of first optical fibers; and a second optical fiber includes the step of joining together an end surface of the optical fiber bundle and an end surface of the second optical fiber by fusion-splicing, the plurality of first optical fibers including at least one predetermined first optical fiber and the other first optical fibers, the at least one predetermined first optical fiber being composed of one or more materials having higher softening temperatures than one or more materials for the other first optical fibers.

According to one or more embodiments of the present invention, it is possible to reduce deformation in a cross section of a predetermined first optical fiber in an optical combiner more than in conventional optical combiners, the optical combiner being obtained by joining, by fusion-splicing, an optical fiber bundle formed by a plurality of first optical fibers to a second optical fiber.

BRIEF DESCRIPTION OF DRAWINGS

FIG. 2A is a transverse cross-sectional view of the optical combiner and FIG. 2B is a transverse cross-sectional view of a variation of the optical combiner.

DETAILED DESCRIPTION

Figure 1:
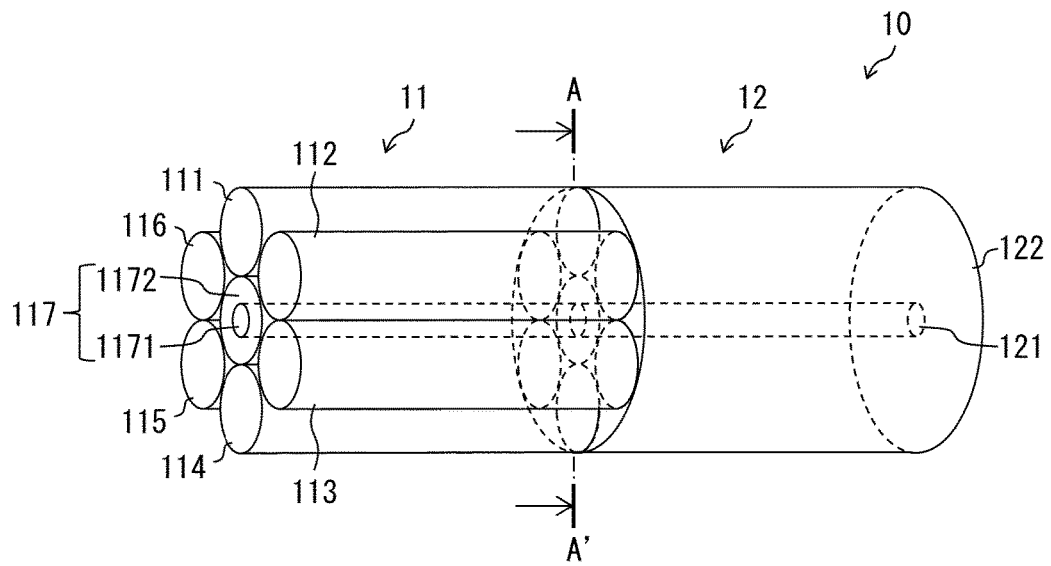
FIG. 1 is a perspective view of an optical combiner in accordance with one or more embodiments of the present invention.
Figure 2A:
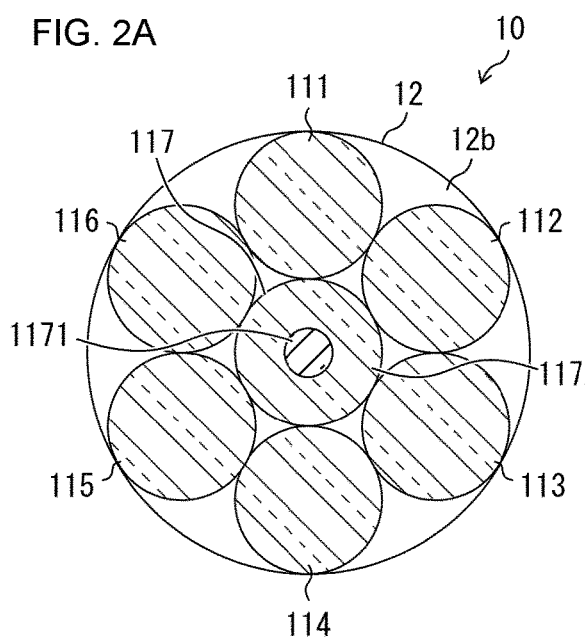
FIGS. 2A and 2B are views of the optical combiner illustrated in FIG. 1.
Figure 2B:
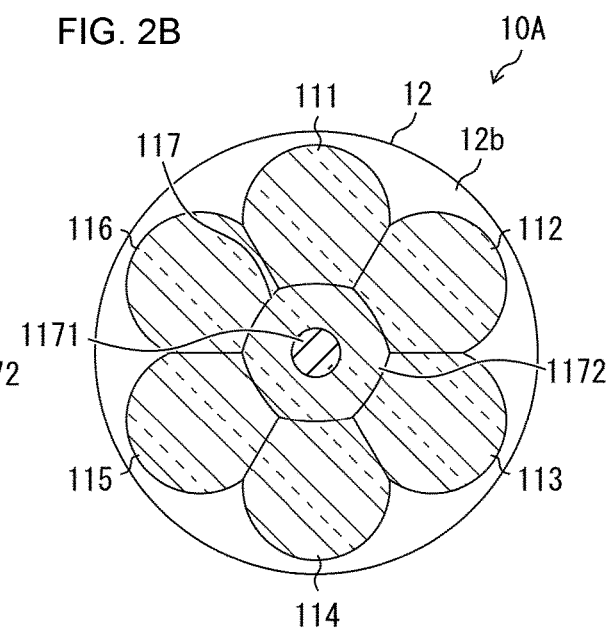

The following will describe an optical combiner 10 in accordance with one or more embodiments of the present invention with reference to FIG. 1 and FIG. 2A. The following will also describe an optical combiner 10A, which is a variation of the optical combiner 10, with reference to (FIG. 2B. FIG. 1 is a perspective view of the optical combiner 10. FIG. 2A is a transverse cross-sectional view of the optical combiner 10, and FIG. 2B is a transverse cross-sectional view of the optical combiner 10A. FIG. 2A is a view of a transverse cross section of the optical combiner 10 taken along line AA' indicated in FIG. 1. FIG. 2B is a view of a cross section of the optical combiner 10A taken in the same manner as in FIG. 2A. The line AA' is a line parallel to an end surface of an optical fiber bundle 11 and an end surface of a second optical fiber 12. Meanwhile, the line AA' is located at a position on the optical fiber bundle 11—side of a point at which the optical fiber bundle 11 and the second optical fiber 12 are joined together by fusion-splicing, i.e., a line located at or in the vicinity of the end surface of the optical fiber bundle 11.

(Configuration of Optical Combiner 10)

As illustrated in FIG. 1, the optical combiner 10 includes: the optical fiber bundle 11 formed by seven first optical fibers 111 to 117; and the second optical fiber 12.

Of the seven first optical fibers 111 to 117, the first optical fiber 117 is an example of a predetermined first optical fiber, and the six first optical fibers 111 to 116 are an example of the other first optical fibers. In one or more embodiments, the first optical fibers 111 to 116 and the first optical fiber 117 are substantially equal in diameter to each other.

The first optical fiber 117 includes: a core 1171, which is an example of a first core; a cladding 1172, which is an example of a first cladding; and a first polymer cladding (not illustrated in FIGS. 1 and 2). The first polymer cladding is a resin film covering a side surface of the cladding 1172. The core 1171, the cladding 1172, and the first polymer cladding have their respective refractive indexes that decrease in this order. Thus, the cladding 1172 serves as an inner cladding and the first polymer cladding serves as an outer cladding. In other words, the first optical fiber 117 is a double cladding fiber. As illustrated in FIG. 1, the first polymer cladding is removed from the end surface of the first optical fiber 117 and the vicinity thereof. Alternatively, the first optical fiber 117 can be a single cladding fiber in which the first polymer cladding is omitted.

In one or more embodiments, the core 1171 is made of quartz glass doped with germanium (Ge), and the cladding 1172 is made of quartz glass consisting of silicon (Si) and oxygen (O) and containing no dopant. Germanium (Ge) is a dopant that not only increases the refractive index of quartz glass but also slightly lowers the softening temperature of the quartz glass.

The first optical fibers 111 to 116 are configured in a manner identical to each other except that the first optical fibers 111 to 116 are positioned in respective different directions relative to the first optical fiber 117. The first optical fibers 111 to 116 therefore have respective diameters equal to each other.

As such, the following will describe the first optical fibers 111 to 116 by taking the first optical fiber 111 as an example. The first optical fiber 111 has a side surface covered with a first polymer cladding (not illustrated in FIGS. 1 and 2). The first polymer cladding of the first optical fiber 111 is a resin film as with the first polymer cladding of the first optical fiber 117. The first optical fiber 111 has a refractive index greater than the refractive index of the first polymer cladding. The first optical fiber 111 is therefore a single cladding fiber. As illustrated in FIG. 1, the first polymer cladding of the first optical fiber 111 is removed from the end surface of the first optical fiber 111 and the vicinity thereof.

In one or more embodiments, the first optical fiber 111 is made of quartz glass doped with fluorine (F). Fluorine is a dopant that significantly lowers the refractive index and the softening temperature of quartz glass. Boron (B) is also known as a dopant that significantly lowers the refractive index and the softening temperature of quartz glass. Accordingly, the first optical fiber 111 can be made of quartz glass doped with boron (B) instead of fluorine (F).

In one or more embodiments, the core 1171 is made of quartz glass doped with Ge, the cladding 1172 is made of quartz glass containing no dopant, and the first optical fibers 111 to 116 are each made of quartz glass doped with F, as described above. The first optical fiber 117 including the core 1171 and the cladding 1172 is therefore composed of materials having higher softening temperatures than a material for the first optical fibers 111 to 116. The softening temperature of the first optical fiber 117 can be defined, in accordance with a ratio of the cross-sectional area of the cladding 1172 to the total cross-sectional area of the first optical fiber 117, by using (i) the softening temperature of the cladding 1172, or (ii) an average softening temperature for the core 1171 and the cladding 1172, the average softening temperature being calculated in accordance with a proportion between the cross-sectional areas of the core 1171 and the cladding 1172. Specifically, in a case where the ratio is large, the softening temperature of the first optical fiber 117 can be defined by using the softening temperature of the cladding 1172, and in a case where the ratio is small, the softening temperature of the first optical fiber 117 can be defined by using the average softening temperature. For example, in a case where the ratio is not less than a half, the softening temperature of the first optical fiber 117 can be defined by using the softening temperature of the cladding 1172, and in a case where the ratio is less than a half, the softening temperature of the first optical fiber 117 can be defined by using the average softening temperature.

The second optical fiber 12 includes: a core 121, which is an example of a second core; a cladding 122, which is an example of a second cladding; and a second polymer cladding (not illustrated in FIGS. 1 and 2). The second polymer cladding is a resin film covering a side surface of the cladding 122. The refractive index of the core 121, the refractive index the cladding 122, and the refractive index of the second polymer cladding are arranged to descend in this order. Thus, the cladding 122 serves as an inner cladding, and the second polymer cladding serves as an outer cladding. The second optical fiber 12 is therefore a double cladding fiber. As illustrated in FIG. 1, the second polymer cladding is removed from the end surface of the second optical fiber 12 and the vicinity thereof. The second optical fiber 12 can be a single cladding fiber in which the second polymer cladding is omitted. In one or more embodiments where the second optical fiber 12 has an end surface that is away from the optical fiber bundle 11 and that is connected to a gain fiber (for example, a gain fiber 13 illustrated in FIG. 4) which will be described later, the second optical fiber 12 may be a double cladding fiber.

In one or more embodiments, the core 121 is made of quartz glass doped with germanium (Ge), and the cladding 122 is made of quartz glass consisting of silicon (Si) and oxygen (O) and containing no dopant. Alternatively, in one or more embodiments of the present invention, the cladding 122 can be made of quartz glass doped with a dopant such as fluorine (F) or boron (B) that significantly lowers the refractive index and the softening temperature of quartz glass.

In one or more embodiments, the second optical fiber 12 has a diameter equal to the diameter of the optical fiber bundle 11, as illustrated in FIG. 2A. In other words, the diameter of the second optical fiber 12 is equal to three times the diameter shared by the first optical fibers 111 to 116. In this regard, the diameter of the second optical fiber 12 is not limited to this, and can exceed the diameter of the optical fiber bundle 11.

The seven first optical fibers 111 to 117 form the optical fiber bundle 11 by being disposed such that, in a transverse cross section of the optical fiber bundle 11, a circumscribed circle circumscribing the optical fiber bundle 11 (in one or more embodiments, the circumscribed circle coincides with a circle forming the periphery of the second optical fiber 12) has a minimum diameter as illustrated in FIG. 2A. In the optical fiber bundle 11, the first optical fiber 117 is disposed in or near the center of the optical fiber bundle 11, and the first optical fibers 111 to 116 are each disposed so as to surround and adjoin the first optical fiber 117. Specifically, the first optical fibers 111 to 117 are disposed in the optical fiber bundle 11 such that the first optical fiber 111 adjoins the first optical fiber 117 in the twelve o'clock direction, the first optical fiber 112 adjoins the first optical fiber 117 in the two o'clock direction, the first optical fiber 113 adjoins the first optical fiber 117 in the four o'clock direction, the first optical fiber 114 adjoins the first optical fiber 117 in the six o'clock direction, the first optical fiber 115 adjoins the first optical fiber 117 in the eight o'clock direction, and the first optical fiber 116 adjoins the first optical fiber 117 in the ten o'clock direction.

Accordingly, in the transverse cross-sectional view of the optical fiber bundle 11, the first optical fiber 117 is disposed in the center of the circumscribed circle, or disposed so as to be closer to the center of the circumscribed circle than the first optical fibers 111 to 116 are. In other words, the first optical fibers 111 to 116 are disposed near the circumference of the circumscribed circle.

In the optical combiner 10, the end surface of the optical fiber bundle 11 (the respective end surfaces of the first optical fibers 111 to 117) and the end surface of the second optical fiber 12 are joined together by fusion-splicing, as illustrated in FIG. 1. More specifically, (1) the core 1171 is joined to the core 121 by fusion-splicing, (2) the cladding 1172 is joined to the cladding 122 by fusion-splicing, and (3) each of the first optical fibers 111 to 116 is joined to the cladding 122 by fusion-splicing.

According to one or more embodiments, the seven first optical fibers 111 to 117 are used as a plurality of first optical fibers. In this regard, the number of the first optical fibers in embodiments of the present invention is not limited to this, and can be selected as appropriate. In the transverse cross-sectional view of the end surface of the optical fiber bundle 11, in a case where the predetermined first optical fiber is disposed in or near the center of the circumscribed circle (i.e., so that the first core and the second core are coupled together), examples of the number of the first optical fibers include 19, in addition to 7. When the number of the first optical fibers is 19 and the 19 first optical fibers are disposed in a manner that forms five layers in which the respective numbers of the first optical fibers are three-four-five-four-three and which are stacked in this order, the predetermined first optical fiber is disposed in or near the center of the circumscribed circle.

Further, according to one or more embodiments, the first optical fibers 111 to 117 are disposed in a manner that minimizes the diameter of the circumscribed circle in a transverse cross-sectional view of the end surface of the optical fiber bundle 11. In this regard, in embodiments of the present invention, how the plurality of first optical fibers are disposed is not limited to this and can be determined as appropriate.

According to one or more embodiments, the number of the predetermined first optical fiber 117, of the plurality of first optical fibers 111 to 117, is one. In this regard, the number of the predetermined first optical fibers is not limited to this in embodiments of the present invention. For example, the second optical fiber can be a multicore fiber, which has a plurality of cores, in one or more embodiments of the present invention. For example, in one or more embodiments where the second optical fiber has two cores, two of the plurality of first optical fibers may be used as the predetermined first optical fiber, the two first optical fibers being disposed so as to be in one-to-one correspondence to the two cores of the second optical fiber.

(Effect of Optical Combiner 10)

As above, the optical combiner 10 includes the optical fiber bundle 11 and the second optical fiber 12, and the core 1171 and the cladding 1172 of the first optical fiber 117 are composed of materials having higher softening temperatures than a material for the first optical fibers 111 to 116.

This configuration makes the cross section of the first optical fiber 117 less likely to deform than the cross sections of the first optical fibers 111 to 116 in a fusion-splicing step (for example, a fusion-splicing step S12, which will be described later) of joining the end surface of the optical fiber bundle 11 to the end surface of the second optical fiber 12 by fusion-splicing. This is because temperatures at and in the vicinity of the respective end surfaces of the first optical fibers 111 to 117 are considered to be substantially equal to each other in the fusion-splicing step, and in such a case, the first optical fiber 117 has a higher viscosity than the first optical fibers 111 to 116. The viscosity of the first optical fiber 117 can be defined in a manner similar to that for the softening temperature of the first optical fiber 117. That is, the viscosity of the first optical fiber 117 can be defined, in accordance with a ratio of the cross-sectional area of the cladding 1172 to the total cross-sectional area of the first optical fiber 117, by using (i) the viscosity of the cladding 1172, or (ii) an average viscosity for the core 1171 and the cladding 1172, the average viscosity being calculated in accordance with a proportion between the cross-sectional areas of the core 1171 and the cladding 1172. Specifically, in a case where the ratio is large, the viscosity of the first optical fiber 117 can be defined by using the viscosity of the cladding 1172, and in a case where the ratio is small, the viscosity of the first optical fiber 117 can be defined by using the average viscosity. For example, in a case where the ratio is not less than a half, the viscosity of the first optical fiber 117 can be defined by using the viscosity of the cladding 1172, and in a case where the ratio is less than a half, the viscosity of the first optical fiber 117 can be defined by using the average viscosity.

This makes it possible to reduce deformation in the cross section of the first optical fiber 117, i.e., deformation in the cross sections of the core 1171 and the cladding 1172, in the optical combiner 10 more than in conventional optical combiners. It is therefore possible to enhance quality of the following beams in the optical combiner 10 more than in conventional optical combiners: (1) a beam which enters through an end surface of the first optical fiber 117, the end surface not being joined to the second optical fiber 12 by fusion-splicing, and which exits through an end surface of the second optical fiber 12, the end surface not being joined to the optical fiber bundle 11 by fusion-splicing, and/or (2)

a beam which enters through the end surface of the second optical fiber 12, the end surface not being joined to the optical fiber bundle 11 by fusion-splicing and which exits through the end surface of the first optical fiber 117, the end surface not being joined to the second optical fiber 12 by fusion-splicing. It should be noted that the cross section of the core 1171 is deformed less than the cross section of the cladding 1172. In other words, an effect of reducing deformation of the core 1171 is larger than an effect of reducing deformation of the cladding 1172, in the optical combiner 10. This is because the cladding 1172 surrounds the core 1171, and the cladding 1172 is made of a material having a higher softening temperature than a material for the first optical fibers 111 to 116.

In a transverse cross-sectional view of the optical fiber bundle 11 of the combiner 10, the first optical fiber 117 is disposed in the center of a circumscribed circle circumscribing the optical fiber bundle 11, or disposed so as to be closer to the center of the circumscribed circle than the first optical fibers 111 to 116 are.

With this configuration, it is possible to improve efficiency of coupling between the first optical fiber 117 and the second optical fiber 12, or more specifically, efficiency of coupling between the core 1171 and the core 121, more than with a configuration in which the first optical fiber 117 is disposed near the circumference of the circumscribed circle. The reason for this is as follows.

When the optical fiber bundle 11 and the second optical fiber 12 are each heated so as to be joined together by fusion-splicing, the respective cross sections of the first optical fibers 111 to 117 which form the optical fiber bundle 11 deform in a manner that minimizes the surface area of the optical fiber bundle 11. In other words, the respective cross sections of the first optical fibers 111 to 117 deform due to surface tension which can occur during fusion of the first optical fibers 111 to 117.

During the fusion, the surface tension acting on the first optical fiber 117 disposed in or near the center of the circumscribed circle acts more isotropically than the surface tension acting on the first optical fibers 111 to 116 disposed near the periphery of the circumscribed circle. This is because an environment surrounding the first optical fiber 117 disposed in or near the center of the circumscribed circle is isotropic or substantially isotropic, whereas an environment surrounding the first optical fibers 111 to 116 disposed near the periphery of the circumscribed circle is anisotropic. Specifically, the first optical fiber 117 is isotropically surrounded by the first optical fibers 111 to 116. On the other hand, for each of the first optical fibers 111 to 116 (for example, the first optical fiber 111), three first optical fibers (for example, the first optical fibers 112, 116, and 117) are disposed along half of the circumference of the first optical fiber 111, and no first optical fiber is disposed along the remaining half of the circumference of the first optical fiber 111.

Consequently, deformation which may occur in the cross section is more isotropic and the degree of the deformation is smaller in a case where the predetermined first optical fiber is disposed in or near the center of the circumscribed circle than in a case where the predetermined first optical fiber is disposed near the periphery of the circumscribed circle.

In the optical combiner 10, the first optical fiber 117 includes the core 1171 and the cladding 1172, and the second optical fiber 12 includes the core 121 and the cladding 122. The core 1171 and the core 121 are joined together by fusion-splicing.

With this configuration, it is possible to improve efficiency of coupling between the core 1171 and the core 121, more than with a configuration in which the core 1171 and the core 121 are not joined together by fusion-splicing. The optical combiner 10 can be therefore suitably used as an optical combiner which forms a part of a fiber laser device (for example, a fiber laser device 1 illustrated in FIG. 4).

In the optical combiner 10, all of the first optical fibers 111 to 116 are joined to the second optical fiber 12 by fusion-splicing.

With this configuration, it is possible to optically couple the first optical fibers 111 to 116 to the second optical fiber 12 (specifically, the cladding 122). The optical combiner 10 can be therefore suitably used as an optical combiner which forms a part of a fiber laser device (for example, the fiber laser device 1 illustrated in FIG. 4).

Supplemental Notes Regarding Terms Used in One or More Embodiments

The expressions "identical" and "equal" that are used in one or more embodiments for describing the first optical fibers 111 to 116 mean that the dimensions and properties of the first optical fibers 111 to 116 vary within respective ranges including manufacturing tolerances in manufacturing the first optical fibers 111 to 116.

[Variation]

An optical combiner 10A, which is a variation of the optical combiner 10, has a configuration in which the respective end portions of the first optical fibers 111 to 117 are united together without a gap as illustrated in FIG. 2B.

In order to form a fused portion as disclosed in Patent Literature 1 by uniting together respective end portions of the first optical fibers 111 to 117 without a gap, the following can be carried out. First, the first optical fibers 111 to 117 are fused while adjacent ones of the first optical fibers 111 to 117 are kept in contact with each other, until gaps having been formed around the first optical fiber 117 disappear. Subsequently, the fusion-splicing step (for example, the fusion-splicing step S12 which will be described later) is carried out. This is a step of joining together an end surface of the optical fiber bundle 11 and an end surface of the second optical fiber 12 by fusion-splicing.

In a case where a gap is left between adjacent ones of the first optical fibers 111 to 117 (i.e., in a case of the optical combiner 10), light that has been propagated through the second optical fiber 12 is coupled to the gap. This may cause the light to leak out of the optical combiner 10. This configuration in which no gap is left between any adjacent ones of the first optical fibers 111 to 117 increases the proportion of light that has been propagated through the second optical fiber 12 and that is coupled to any of the first optical fiber 117 and the first optical fibers 111 to 116. It is therefore possible, in the optical combiner 10A, to decrease the possibility of leakage of light out of the optical combiner 10A, the light having been propagated through the second optical fiber 12. Further, in a case where the edge at an end portion of the optical fiber 12 is melted and tapered in the fusion-splicing step, it is also possible to decrease the possibility of leakage of light out of the optical combiner 10A through the peripheral part of the second optical fiber 12, the light having been propagated through the second optical fiber 12. In addition, decreasing the diameter of the second optical fiber 12 makes it possible to further reduce light leaking out through the peripheral part of the second optical fiber 12, as disclosed in Patent Literature 1.

As in the optical combiner 10A, in one or more embodiments, the first optical fiber 117 may be disposed in the center of a circumscribed circle circumscribing the optical fiber bundle 11, or disposed so as to be closer to the center of the circumscribed circle than are the first optical fibers 111 to 116 as illustrated in FIG. 2B, even in a case where a fused portion is formed at the respective end portions of the first optical fibers 111 to 117. With this configuration, it is possible to further reduce deformation in the cross section of the first optical fiber 117. The reason for this is as follows.

In a case where respective end portions of the first optical fibers 111 to 117 are united together without a gap by forming a fused portion at the respective end portions of the first optical fibers 111 to 117, the optical fiber bundle 11 has only one surface that is the outer surface of the optical fiber bundle 11 located near the periphery of the circumscribed circle. Thus, surface tension which can be generated when the optical fiber bundle 11 is fused is composed of only surface tension due to the outer surface of the optical fiber bundle 11. This surface tension isotropically acts on the first optical fiber 117 disposed in or near the center of the circumscribed circle, whereas this surface tension anisotropically acts on each of the first optical fibers 111 to 116 disposed near the circumference of the circumscribed circle.

Consequently, deformation which may occur in the cross section is more isotropic and the degree of the deformation is smaller in a case where the first optical fiber 117 is disposed in or near the center of the circumscribed circle than in a case where the first optical fiber 117 is disposed near the periphery of the circumscribed circle. It is therefore possible to further reduce the degree of deformation in the cross section of the first optical fiber 117.

Figure 3:
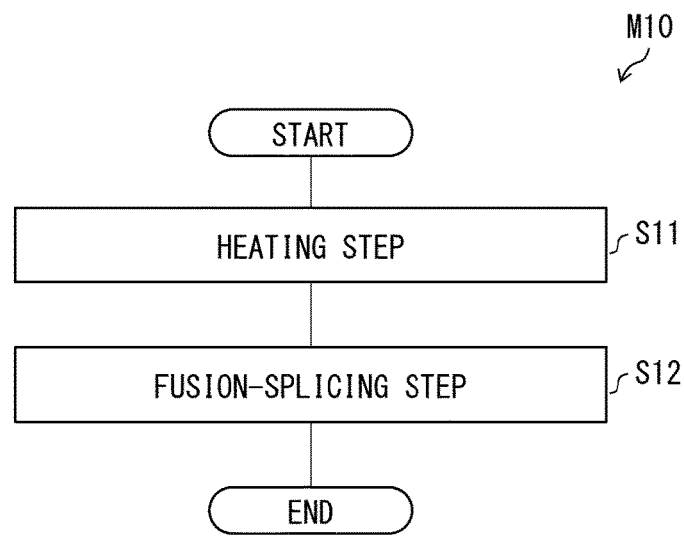
FIG. 3 is a flowchart of a method for manufacturing an optical combiner in accordance with one or more embodiments of the present invention.

The following will describe a method M10 for manufacturing an optical combiner, in accordance with one or more embodiments of the present invention, with reference to FIG. 3. FIG. 3 is a flowchart of the manufacturing method M10. The manufacturing method M10 can be suitably used in manufacturing, for example, combiners including the optical combiner 10 illustrated in FIG. 1 and FIG. 2A and the optical combiner 10A illustrated in FIG. 2B. The description of one or more embodiments will discuss the manufacturing method M10 by mainly using the optical combiner 10. Note that members of the optical combiner 10 have been described in the above-described embodiments and will not be repeatedly described below.

As illustrated in FIG. 3, the manufacturing method M10 includes a heating step S11 and a fusion-splicing step S12.

The heating step S11 is a step of heating the first optical fibers 111 to 117. This step is a step of heating an end surface of each of the optical fiber bundle 11 and the second optical fiber 12 and the vicinity of the end surface so that the first optical fiber 117 has a viscosity that is more than two times the viscosity of the first optical fibers 111 to 116.

The fusion-splicing step S12 is a step of joining together, by fusion-splicing, the end surfaces of the optical fiber bundle 11 and the second optical fiber 12 that are heated in the heating step S11.

The manufacturing method M10 includes the heating step S11, in which the end surface of each of the optical fiber bundle 11 and the second optical fiber 12 and the vicinity of the end surface are heated so that the first optical fiber 117 has a viscosity that is more than two times the viscosity of the first optical fibers 111 to 116. The manufacturing method M10 therefore makes it possible to reduce, more than conventional methods, deformation which may occur in the cross section of the first optical fiber 117 when the heating step S11 and the fusion-splicing step S12 are carried out.

Consequently, it is possible to enhance quality of the following beams in the optical combiner 10 manufactured by using the manufacturing method M10, as compared to that in optical combiners manufactured by using conventional methods: (1) a beam which enters through an end surface of the first optical fiber 117, the end surface not being joined to the second optical fiber 12 by fusion-splicing, and which exits through an end surface of the second optical fiber 12, the end surface not being joined to the optical fiber bundle 11 by fusion-splicing, and/or (2) a beam which enters through the end surface of the second optical fiber 12, the end surface not being joined to the optical fiber bundle 11 by fusion-splicing, and which exits through the end surface of the first optical fiber 117, the end surface not being joined to the second optical fiber 12 by fusion-splicing.

In manufacturing the optical combiner 10A illustrated in FIG. 2B, the fusion-splicing step S12 is carried out after a uniting step is carried out. This uniting step is a step of uniting together respective end portions of the first optical fibers 111 to 117 without a gap. In the uniting step, the first optical fibers 111 to 117 are fused while adjacent ones of the first optical fibers 111 to 117 are kept in contact with each other, until gaps having been formed around the first optical fiber 117 disappear. Carrying out the uniting step leads to formation, at an end portion of the optical fiber bundle 11, of a fused portion in which respective end portions of the first optical fibers 111 to 117 are united together without a gap.

There is no limitation on a process for uniting together the respective end portions of the first optical fibers 111 to 117 without a gap, and the process can be selected from existing processes as appropriate. Examples of the process for uniting together respective end portions of the first optical fibers 111 to 117 without a gap include, in addition to the process disclosed in Patent Literature 1, a process in which the first optical fibers 111 to 117 are heated while the first optical fibers 111 to 117 are kept inserted in a capillary tube made of, for example, quartz glass, until the first optical fibers 111 to 117 fuse in the above-described manner. This process, however, inevitably causes the fused portion to have a diameter which increases by the wall thickness of the capillary tube. In a case where a fused portion having a diameter as thin as possible is desired, a process in which a capillary tube is not used (for example, the process disclosed in Patent Literature 1) should be employed. Even when the fused portion is formed by using a capillary tube, the wall thickness of the capillary tube is not included in the diameter of the optical fiber bundle 11. This means that a comparison between the optical fiber bundle 11 and the second optical fiber 12 in terms of size is made by using the diameter of a circumscribed circle circumscribing the first optical fibers 111 to 117 and the diameter of the second optical fiber 12.

Alternatively, the fusion-splicing step S12 in the manufacturing method M10 can be carried out after completion of heating of the end surface of each of the optical fiber bundle 11 and the second optical fiber 12 and the vicinity of the end surface in heating step S11, or can be carried out while the heating is carried out.

Figure 4:
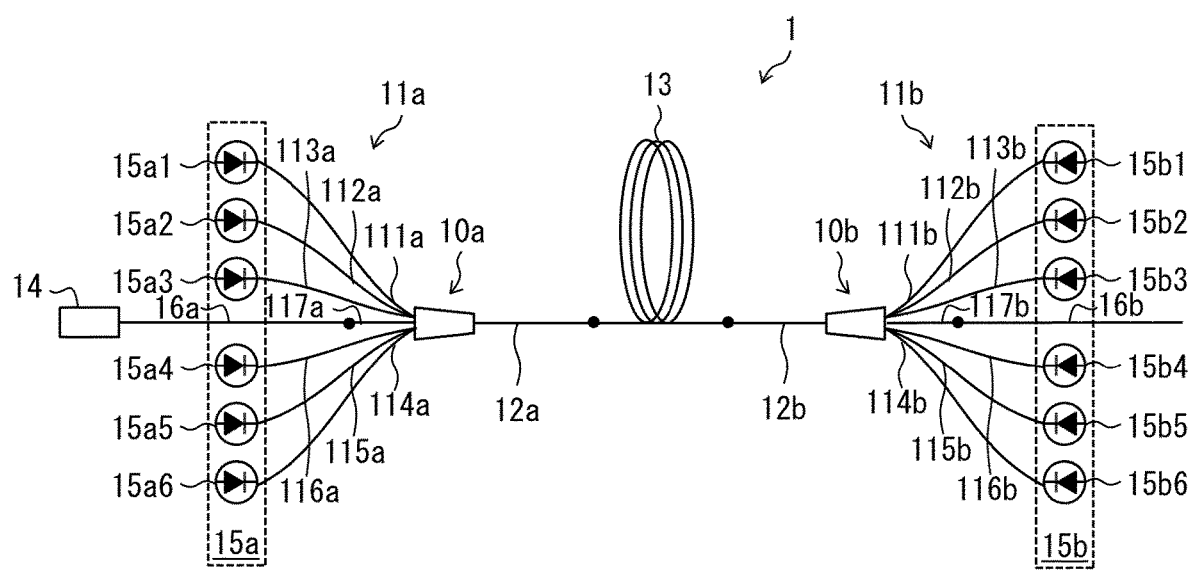
FIG. 4 is a block diagram of a fiber laser device in accordance with one or more embodiments of the present invention.

The following will describe a fiber laser device 1 in accordance with one or more embodiments of the present invention with reference to FIG. 4. FIG. 4 is a block diagram of the fiber laser device 1.

The fiber laser device 1, which is an example of a laser device, includes optical combiners 10a and 10b, a gain fiber 13, a seed light source 14, pump light source groups 15a and 15b, and delivery fibers 16a and 16b, as illustrated in FIG. 4. The fiber laser device 1 is a laser device of a master oscillator-power amplifier (MOPA) type. Specifically, the seed light source 14 serves as a master oscillator (MO) section, and the optical combiners 10a and 10b, the gain fiber 13, and the pump light source groups 15a and 15b serve as a power amplifier (PA) section.

Both the optical combiners 10a and 10b have a configuration identical to the configuration of the optical combiner 10 illustrated in FIG. 1 and FIG. 2A.

The gain fiber 13 is an amplifying optical fiber which has a function of amplifying seed light by using energy of pump light to generate high-power laser light. One or more embodiments use, as the gain fiber 13, a double cladding fiber having a core doped with a rare earth element. In this regard, the gain fiber 13 is not limited to the double cladding fiber. In other words, other optical fibers can be used as the gain fiber 13, provided that the optical fibers include a waveguide for guiding laser light (corresponding to the core) and a waveguide for guiding pump light (corresponding to the cladding). Further, one or more embodiments use ytterbium as the rare earth element with which the core is doped. In this regard, the rare earth element with which the core is doped is not limited to ytterbium. The core can be doped with a rare earth element such as thulium, cerium, neodymium, europium, or erbium, other than ytterbium.

The seed light source 14, which is a master oscillator section, is a laser light source for generating seed light which is to be amplified by the gain fiber 13 (described later). Embodiments of the laser light source employed as the seed light source 14 are not limited. For example, the laser light source can be a resonator-type fiber laser, or can be any of a semiconductor laser, a solid laser, a liquid laser, and a gas laser.

The pump light source group 15a includes pump light sources 15a1 to 15a6 and the pump light source group 15b includes pump light sources 15b1 to 15b6. The pump light sources 15a1 to 15a6 and the pump light sources 15b1 to 15b6 generate pump light which is to be supplied to the gain fiber 13. A laser light source employed as the pump light sources 15a1 to 15a6 and the pump light sources 15b1 to 15b6 is not limited, provided that the laser light source is capable of generating light which is capable of transitioning, to a population inversion, the state of the rare earth element with which the core of the gain fiber 13 is doped. For example, one or more embodiments of the laser light source can be a resonator-type fiber laser, or can be any of a semiconductor laser, a solid laser, a liquid laser, and a gas laser. One or more embodiments employs a semiconductor laser as the laser light source which constitutes the pump light sources 15a1 to 15a6 and the pump light sources 15b1 to 15b6.

One or more embodiments use a few-mode fiber as the delivery fibers 16a and 16b. In this regard, the delivery fibers 16a and 16b are not limited to the few-mode fiber. Specifically, it is possible to use, as the delivery fibers 16a and 16b, any optical fiber that is capable of guiding seed light that has been outputted from the seed light source 14 and guiding output light that has been amplified in the gain fiber 13 and that is to be then outputted from the delivery fiber 16b. Examples of such an optical fiber include a single-mode fiber and a multi-mode fiber other than a few-mode fiber. Note that the few-mode fiber refers to an optical fiber that is categorized as a multi-mode fiber (an optical fiber having two or more waveguide modes) and that has 25 or less waveguide modes.

The seed light source 14 is connected to one end portion of the delivery fiber 16a. The other end portion of the delivery fiber 16a is connected to a first optical fiber 117a of the optical combiner 10a. The pump light sources 15a1, 15a2, 15a3, 15a4, 15a5, and 15a6 of the pump light source group 15a are connected to the first optical fibers 111, 112, 113, 114, 115, and 116 of the optical combiner 10a, respectively. The optical combiner 10a has a second optical fiber 12a that is joined to one end portion of the gain fiber 13 by fusion-splicing.

The delivery fiber 16b has one end portion that is connected to an output head (not illustrated in FIG. 4). The other end portion of the delivery fiber 16b is connected to a first optical fiber 117b of the optical combiner 10b. The pump light sources 15b1, 15b2, 15b3, 15b4, 15b5, and 15b6 of the pump light source group 15b are connected to the first optical fibers 111, 112, 113, 114, 115, and 116 of the optical combiner 10b, respectively. The optical combiner 10b has a second optical fiber 12b that is joined to the other end portion of the gain fiber 13 by fusion-splicing.

The first optical fibers 111a to 116a of the optical combiner 10a and the first optical fibers 111b to 116b of the optical combiner 10b serve as respective ports corresponding to the pump light sources. The first optical fiber 117a of the optical combiner 10a serves as a port corresponding to the seed light source. The first optical fiber 117b of the optical combiner 10b serves as a port corresponding to the output head. The second optical fibers 12a and 12b of the optical combiners 10a and 10b serve as ports corresponding to the gain fiber.

In one or more embodiments, the fiber laser device 1 is implemented in the form of a bidirectional pumping fiber laser device equipped with the pump light source group 15a and the pump light source group 15b. In this regard, the present invention is not limited to this. The fiber laser device 1 can be implemented in the form of a unidirectional pumping fiber laser device equipped with only one pump light source that is the pump light source group 15a or the pump light source group 15b.

It is possible to reduce deformation in the cross section of the first optical fiber 117a of the optical combiner 10a in the fiber laser device 1 configured as above, more than in conventional fiber laser devices. The optical combiner 10a is therefore capable of coupling seed light generated by the seed light source 14 to the second optical fiber 12a while beam quality is less deteriorated than beam quality in conventional optical combiners.

It is also possible to reduce deformation in the cross section of the first optical fiber 117b of the optical combiner 10b in the fiber laser device 1 more than in conventional fiber laser devices. The optical combiner 10b is therefore capable of coupling laser light amplified by the gain fiber 13 to the first optical fiber 117b while the beam quality is less deteriorated than the beam quality in the conventional optical combiners. In other words, the fiber laser device 1 is capable of irradiating a workpiece with laser light from the output head, the laser light having beam quality higher than that achieved by conventional fiber laser devices.

The scope of one or more embodiments of the present invention also includes a fiber laser system including a plurality of fiber laser devices 1. It is possible for the fiber laser system to generate laser light having higher power than the laser light generated by the fiber laser device 1, by combining respective laser beams of light generated by the fiber laser devices 1.

One or more embodiments are described assuming that the fiber laser device 1 is a fiber laser device of the MOPA type. In this regard, a fiber laser device including the optical combiner in accordance with one or more embodiments of the present invention is not limited to the fiber laser device of the MOPA type. The fiber laser device including the optical combiner in accordance with one or more embodiments of the present invention can be a resonator-type fiber laser device in which a resonator is formed by a high reflection mirror and a low reflection mirror that are provided respectively at one end portion and the other end portion of the gain fiber 13.

Embodiments of the present invention can also be expressed as follows:

An optical combiner in accordance with one or more embodiments of the present invention includes: an optical fiber bundle formed by a plurality of first optical fibers; and a second optical fiber having an end surface joined to an end surface of the optical fiber bundle by fusion-splicing, the plurality of first optical fibers including at least one predetermined first optical fiber and the other first optical fibers, the at least one predetermined first optical fiber being composed of one or more materials having higher softening temperatures than one or more materials for the other first optical fibers.

With the above configuration, a cross section of the predetermined first optical fiber is less likely to deform than cross sections of the other first optical fibers, in a fusion-splicing step of joining the end surface of the optical fiber bundle to the end surface of the second optical fiber by fusion-splicing. This is because temperatures at and in the vicinity of those respective end surfaces of the plurality of first optical fibers are considered to be substantially equal to each other in the fusion-splicing step, and in such a case, the predetermined first optical fiber has a higher viscosity than the other first optical fibers. It is therefore possible to reduce deformation in the cross section of the predetermined first optical fiber in the optical combiner in accordance with one or more embodiments, more than in conventional optical combiners. This makes it possible to enhance quality of the following beams in the optical combiner in accordance with one or more embodiments, more than in conventional optical combiners: (1) a beam which enters through an end surface of the predetermined first optical fiber, the surface not being joined to the second optical fiber by fusion-splicing, and which exits through an end surface of the second optical fiber, the end surface not being joined to the optical fiber bundle by fusion-splicing, and/or (2) a beam which enters through the end surface of the second optical fiber, the end surface not being joined to the optical fiber bundle by fusion-splicing, and which exits through the end surface of the predetermined first optical fiber, the end surface not being joined to the second optical fiber by fusion-splicing.

An optical fiber in accordance with one or more embodiments of the present invention is configured such that, in the above-described embodiments, the predetermined first optical fiber is disposed in the center of a circumscribed circle circumscribing the optical fiber bundle, or disposed so as to be closer to the center of the circumscribed circle than are the other first optical fibers, in a transverse cross-sectional view of the optical fiber bundle.

When the optical fiber bundle and the second optical fiber are each heated so as to be joined together by fusion-splicing, deformation in respective cross sections of the plurality of first optical fibers which form the optical fiber bundle occurs in a manner that minimizes a surface area of the optical fiber bundle. In other words, deformation in the respective cross sections of the plurality of first optical fibers occurs due to surface tension caused during fusion of the plurality of first optical fibers.

During the fusion, surface tension acting on the first optical fiber disposed in or near the center of the circumscribed circle acts more isotropically than surface tension acting on the first optical fibers disposed near the circumference of the circumscribed circle. This is because an environment surrounding the first optical fiber disposed in or near the center of the circumscribed circle is isotropic or substantially isotropic, whereas an environment surrounding the first optical fibers disposed near the circumference of the circumscribed circle is anisotropic.

Consequently, deformation which may occur in the cross section is more isotropic and the degree of the deformation is smaller in a case where the predetermined first optical fiber is disposed in or near the center of the circumscribed circle than in a case where the predetermined first optical fiber is disposed near the circumference of the circumscribed circle.

With the above configuration, it is therefore possible to improve efficiency of coupling between the predetermined first optical fiber and the core of the second optical fiber, more than with a configuration in which the predetermined first optical fiber is disposed near the circumference of the circumscribed circle.

An optical fiber in accordance with one or more embodiments of the present invention is configured such that, in the above-described embodiments, the predetermined first optical fiber includes a first core and a first cladding, the second optical fiber includes a second core and a second cladding, and the first core and the second core are joined together by fusion-splicing.

With this configuration, it is possible to improve efficiency of coupling between the first core and the second core, more than with a configuration in which the first core and the second core are not joined together by fusion splicing. The optical combiner in accordance with one or more embodiments can be therefore suitably used as an optical combiner which forms a part of a fiber laser device.

An optical fiber in accordance with one or more embodiments of the present invention is configured such that, in the above-described embodiments, all of the other first optical fibers are joined to the second cladding by fusion-splicing.

With this configuration, it is possible to optically couple the other first optical fibers to the second cladding. The optical combiner in accordance with one or more embodiments can therefore be suitably used as an optical combiner which forms a part of a fiber laser device.

An optical fiber in accordance with one or more embodiments of the present invention is configured such that, in the above-described embodiments, the first core of the predetermined first optical fiber is made of quartz glass doped with germanium and the first cladding of the predetermined first optical fiber is made of quartz glass consisting of silicon and oxygen, and the other first optical fibers are made of quartz glass doped with at least one of fluorine and boron.

Germanium is a dopant that, when used to dope quartz glass, slightly lowers the softening temperature of the quartz glass thus doped. Fluorine and boron are each a dopant that, when used to dope quartz glass, significantly lowers the softening temperature of the doped quartz glass. The above configuration therefore ensures that the softening temperatures of one or more materials for the predetermined first optical fiber exceed the softening temperatures of one or more materials for the other first optical fibers.

An optical fiber in accordance with one or more embodiments of the present invention is configured such that, in the above-described embodiments, the plurality of first optical fibers have respective end portions united together without a gap.

In a case where a gap is left between adjacent ones of the plurality of first optical fibers, light that has been propagated through the second optical fiber is coupled to the gap. As a result, the light may leak out of the optical combiner. With the above configuration, light that has been propagated through the second optical fiber is coupled to the predetermined first optical fiber or the other first optical fibers. This makes it possible to decrease the possibility of leakage of light out of the optical combiner, the light having been propagated through the second optical fiber. Further, in the optical combiner in accordance with one or more embodiments, the predetermined first optical fiber may be disposed in the center of the circumscribed circle, or disposed so as to be closer to the center of the circumscribed circle than are the other first optical fibers, as in the above-described embodiments. This configuration allows the optical fiber bundle to have only one surface that is the outer surface of the optical fiber bundle located near the circumference of the circumscribed circle, as a result of uniting together the respective end portions of the plurality of first optical fibers without a gap. Accordingly, surface tension which can be generated when the optical fiber bundle is fused is composed of only surface tension due to the outer surface of the optical fiber bundle. This surface tension isotropically acts on the predetermined first optical fiber and anisotropically on the plurality of other first optical fibers.

Consequently, deformation which may occur in the cross section is more isotropic and the degree of the deformation is smaller in a case where the predetermined first optical fiber is disposed in or near the center of the circumscribed circle than in a case where the predetermined first optical fiber is disposed near the circumference of the circumscribed circle. It is therefore possible to further reduce the degree of deformation in the cross section of the predetermined first optical fiber.

An optical fiber in accordance with one or more embodiments of the present invention is configured such that, in the above-described embodiments, the second optical fiber has a diameter equal to or larger than the diameter of the optical fiber bundle.

With this configuration, in a transverse cross-sectional view of a point at which the optical fiber bundle and the second optical fiber are joined together by fusion-splicing or the vicinity of the point, the first optical fibers forming the optical fiber bundle can be each included in the second optical fiber. Light that has been propagated through each of the first optical fibers is therefore coupled to the second optical fiber. This makes it possible to decrease the possibility of leakage of light out of the optical combiner, the light having been propagated through each of the first optical fibers.

A laser device in accordance with one or more embodiments of the present invention includes an optical combiner in accordance with any of the above-described embodiments.

With this configuration, the laser device in accordance with one or more embodiments has an effect similar to that of the optical combiner in accordance with any of the above-described embodiments.

In accordance with one or more embodiments, a method for manufacturing an optical combiner, where the optical combiner includes: an optical fiber bundle formed by a plurality of first optical fibers; and a second optical fiber, includes the step of joining together an end surface of the optical fiber bundle and an end surface of the second optical fiber by fusion-splicing, the plurality of first optical fibers including at least one predetermined first optical fiber and the other first optical fibers, the at least one predetermined first optical fiber being composed of one or more materials having higher softening temperatures than one or more materials for the other first optical fibers.

With this configuration, the method for manufacturing an optical combiner, in accordance with one or more embodiments, has an effect similar to that of the optical combiner in accordance with the above-described embodiments.

A method for manufacturing an optical combiner, in accordance with one or more embodiments of the present invention, is configured such that, in the above-described embodiments, the method further includes the step of heating the end surface of each of the optical fiber bundle and the second optical fiber and the vicinity of the end surface so that the predetermined first optical fiber has a viscosity that is above two times the viscosity of the other first optical fibers.

With this configuration, the method, for manufacturing an optical combiner, in accordance with one or more embodiments surely has an effect similar to that of the optical combiner in accordance with the above-described embodiments.

[Additional Remarks]

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10: Optical combiner
11: Optical fiber bundle
111 to 116: First optical fibers (the other first optical fibers)
117: First optical fiber (predetermined first optical fiber)
1171: Core (first core)
1172: Cladding (first cladding)
12: Second optical fiber
121: Core (second core)
122: Cladding (second cladding)
1: Fiber laser device (laser device)
10a, 10b: Optical combiners
11a, 11b: Optical fiber bundles
111a to 116a, 111b to 116b: First optical fibers (the other first optical fibers)
117a, 117b: First optical fibers (predetermined first optical fiber)
12a, 12b: Second optical fibers
13: Gain fiber
14: Seed light source
15a, 15b: Pump light source groups
16a, 16b: Delivery fibers

The invention claimed is:

1. An optical combiner comprising:
an optical fiber bundle formed by a plurality of first optical fibers; and
a second optical fiber including an end surface joined to an end surface of the optical fiber bundle by fusion-splicing, wherein
the plurality of first optical fibers includes a predetermined first optical fiber and other first optical fibers, the predetermined first optical fiber is composed of at least one material having higher softening temperatures than at least one material of the other first optical fibers, the predetermined first optical fiber includes a first core and a first cladding, the second optical fiber includes a second core and a second cladding, the first core and the second core are joined together by the fusion-splicing, respective cross-sections of the first optical fibers are deformed by softening during the fusion-splicing, and a cross-section of an end surface of the predetermined first optical fiber that is joined to the end surface of the second optical fiber is deformed less than cross-sections of end surfaces of the other first optical fibers that are joined to the end surface of the second optical fiber.

2. The optical combiner according to claim 1, wherein the predetermined first optical fiber is:
    disposed in the center of a circumscribed circle of the optical fiber bundle; or
    disposed closer to the center of the circumscribed circle than the other first optical fibers, in a transverse cross-sectional view of the optical fiber bundle.

3. The optical combiner according to claim 1, wherein all of the other first optical fibers are joined to the second cladding by fusion-splicing.

4. The optical combiner according to claim 1, wherein the first core of the predetermined first optical fiber is made of quartz glass doped with germanium, the first cladding of the predetermined first optical fiber is made of quartz glass consisting of silicon and oxygen, and the other first optical fibers are made of quartz glass doped with at least one of fluorine and boron.

5. The optical combiner according to claim 1, wherein the plurality of first optical fibers have respective end portions united together without a gap between the plurality of first optical fibers.

6. The optical combiner according to claim 1, wherein the second optical fiber has a diameter equal to or larger than a diameter of the optical fiber bundle.

7. A laser device comprising an optical combiner according to claim 1.

8. A method for manufacturing an optical combiner that includes an optical fiber bundle formed by a plurality of first optical fibers and a second optical fiber, the method comprising:

joining together an end surface of the optical fiber bundle and an end surface of the second optical fiber by fusion-splicing, wherein the plurality of first optical fibers includes a predetermined first optical fiber and other first optical fibers, the predetermined first optical fiber is composed of at least one material having higher softening temperatures than at least one material of the other first optical fibers, the predetermined first optical fiber includes a first core and a first cladding, the second optical fiber includes a second core and a second cladding, the first core and the second core are joined to each other by the fusion-splicing, respective cross-sections of the first optical fibers are deformed by softening during the fusion-splicing, and a cross-section of an end surface of the predetermined first optical fiber that is joined to the end surface of the second optical fiber is deformed less than cross-sections of end surfaces of the other first optical fibers that are joined to the end surface of the second optical fiber.

9. The method for manufacturing an optical combiner according to claim 8, further comprising heating the end surface of each of the optical fiber bundle and the second optical fiber and a vicinity of the end surface such that the predetermined first optical fiber has a viscosity that is more than two times a viscosity of the other first optical fibers.

* * * * *